No. 772,984. PATENTED OCT. 25, 1904.
Z. B. WEBB.
FASTENING DEVICE.
APPLICATION FILED OCT. 22, 1903.
NO MODEL.
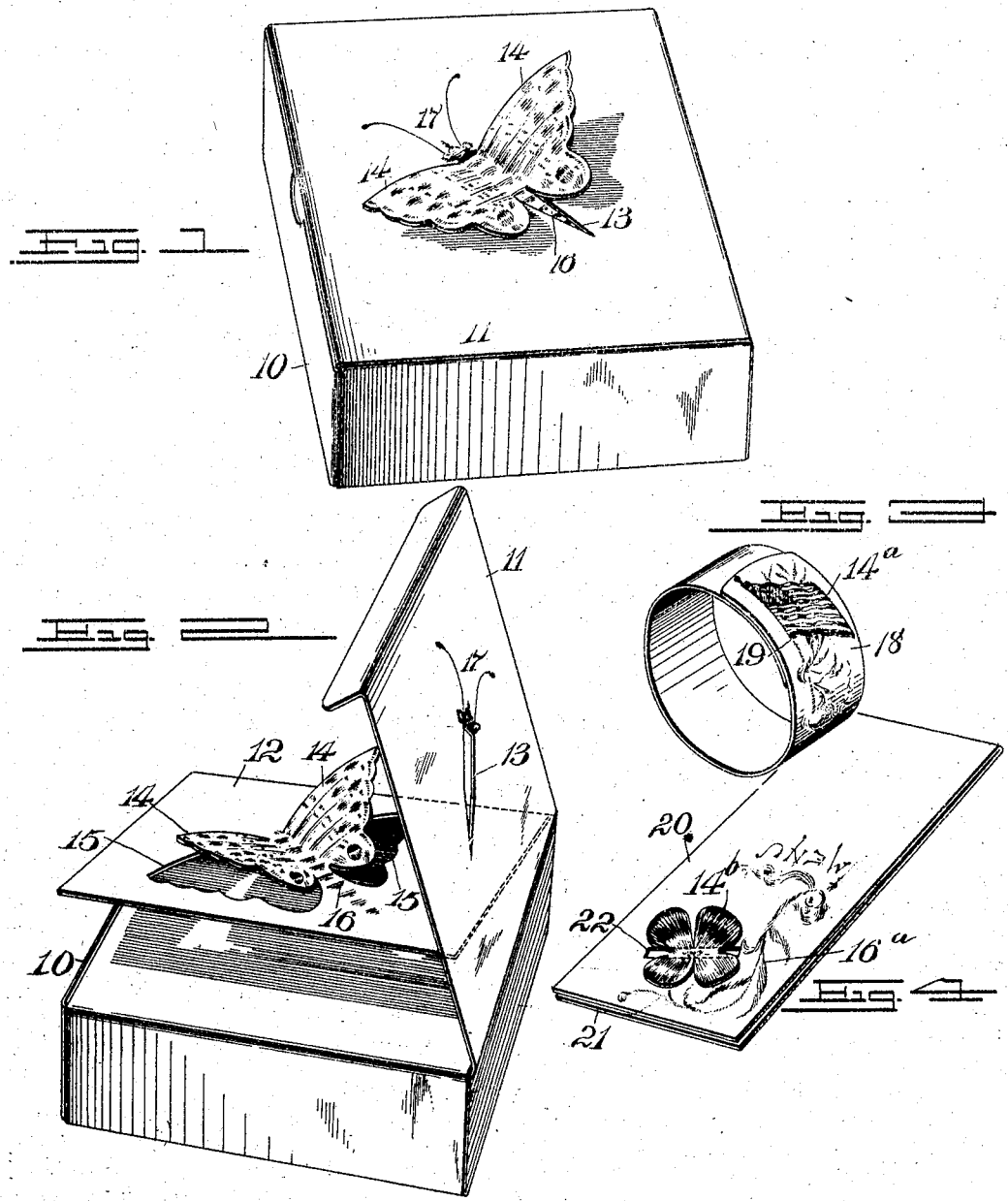
WITNESSES:
INVENTOR.
Zaida B. Webb,
BY
W. B. Hutchinson,
ATTORNEY.

No. 772,984. Patented October 25, 1904.

UNITED STATES PATENT OFFICE.

ZAIDA B. WEBB, OF FLORHAM PARK, NEW JERSEY, ASSIGNOR TO GRAY LITHOGRAPH COMPANY, OF NEW YORK, N. Y., A CORPORATION OF NEW YORK.

FASTENING DEVICE.

SPECIFICATION forming part of Letters Patent No. 772,984, dated October 25, 1904.

Application filed October 22, 1903. Serial No. 178,009. (No model.)

*To all whom it may concern:*

Be it known that I, ZAIDA B. WEBB, of Florham Park, in the county of Morris and State of New Jersey, have invented a new and Improved Fastening Device, of which the following is a full, clear, and exact description.

My invention relates to improvements in that class of fastening devices which is used to attach meeting or overlapping parts in such a manner that the parts may be readily fastened or unfastened, as desired.

One of the chief objects of my invention is to produce an ornamental fastener which is particularly applicable for use in fastening the covers of bonbon-boxes and other boxes, for securing the parts of a booklet, and for forming napkin and other rings, though my invention is not limited to any of these uses.

In consonance with the above idea I provide a fastening preferably in the form of some complete ornamental article—such, for instance, as a butterfly or a flower—in which when the overlapping parts are unattached part of the design will appear on one portion of the parts to be united and the remaining part of the design will appear on the second part of the meeting articles.

From a mechanical point of view the object of my invention is to produce a design of great simplicity which can be easily manipulated and which will serve to hold the parts together with the necessary strength.

To these ends my invention consists of a fastening device the construction of which will be hereinafter clearly described and claimed.

Reference is to be had to the accompanying drawings, forming a part of this specification, in which similar figures of reference indicate corresponding parts in all the views.

Figure 1 is a perspective view of a box with its cover closed and held by my improved fastening. Fig. 2 is a perspective view of the box partly open, so as to show the construction of the fastening device. Fig. 3 shows a napkin-ring having my improvements thereon. Fig. 4 shows how the invention is applied to a booklet.

In Figs. 1 and 2 I have shown the invention as applied to a common form of folding box 10, having a cover 11 folding over a flap 12 on the box; but my invention has no relation to this style of box and can be used with many kinds of boxes or wherever it is desirable to fasten overlapping parts together, though, as previously stated, its use is more largely intended for ornamental devices. As applied to the box the top part 11 has a slot 13, which is long enough to receive the wings 14 of the flap 12 and is wide enough to permit the wings when folded together to be thrust through it. In the particular design shown the wings 14 are made to represent the wings of a butterfly and are cut out of the material of the flap 12, as shown at 15, while the body of the butterfly is indicated by suitable markings between the wings and in the part corresponding to the tail of the butterfly, and the slot 13 is also made in the general shape of a butterfly's body, tapering at one end. At the wider part or the head end of the slot 13 a representation of the head of the butterfly is made on the part 11, the head showing the usual antennæ, and this head portion forms apparently an extension of the slot 13. Consequently when the wings are thrust through the slot 13 and the cover 11 folded down to its closed position there is a good representation of a butterfly apparently lying free on the box top, as shown in Fig. 1, the markings 16 showing through the narrow end of the slot 13 and the head portion forming an apparent continuation of the butterfly's body. When the wings are spread, as in Fig. 1, they serve, as will be apparent, to prevent the accidental raising of the cover 11.

I have shown a butterfly as forming the particular fastening described; but obviously many other designs can be used—as, for instance, the figure or design may represent a flower, as shown at 14$^b$ in Fig. 4, in which case the stem of the flower can be marked on the adjacent material, as shown at 16$^a$ in the same figure.

In Fig. 3 I have shown a napkin-ring 18, which can be made of paper, celluloid, or any suitable material, and here the overlapping part has a slot 19, while the underlying portion has a fastening-flap 14ª in the form of a flag.

In Fig. 4 I have shown the application of the fastener to a booklet, in which the part 20 represents the cover, the part 21 the back, and the fastening flaps or wings are in the form of a flower 14ᵇ, which can be cut out from the under part, as already described, and which are adapted to extend upward through the slot 22 in the part 20.

In Figs. 3 and 4 I have not shown the details as to how the fastening parts are cut out of the lower member, because this is exactly as in Fig. 2, except for the change in design.

From the foregoing description it will be clear that the fastening device can be applied to very many articles, that the essential thing is to have the device when in fastened position represent a complete figure or design, and that it is also important, but not absolutely essential, to have the fastener ornamental. It will also be understood that while I have shown an elongated slot to receive the fastening means or flaps this slot may be of other shapes, if preferred.

In the claim I refer to the fastening parts which extend through the slot as "wings," meaning by this term to include flaps or other flexible equivalents and not to confine myself literally to the wings of a butterfly or other creature.

Having thus fully described my invention, I claim as new and desire to secure by Letters Patent—

The herein-described fastening device, comprising two parts or members adapted to lie one over the other, the top part being slotted and the under part having a wing cut out therefrom, the said wing being adapted to be pushed through the slot of the upper part and extended, the said wing and the upper part being each ornamented so that the design of each is incomplete in itself but the design is completed by fastening the parts as specified.

ZAIDA B. WEBB.

Witnesses:
 WARREN B. HUTCHINSON,
 J. G. DUNBAR.